(12) United States Patent
Nolting, Jr. et al.

(10) Patent No.: US 6,481,540 B1
(45) Date of Patent: Nov. 19, 2002

(54) CART BRAKE RELEASE HANDLE

(76) Inventors: Herman F. Nolting, Jr., P.O. Box 381 Apt. 711, Bonner Springs, KS (US) 66012; Robert E. Doughty, 5100 Foxridge Dr., Apt. 711, Mission, KS (US) 68202; Gary A. Barnhart, 4927 Southridge, Roeland Park, KS (US) 66205

( * ) Notice: Subject to any disclaimer, the term of this patent is extended or adjusted under 35 U.S.C. 154(b) by 0 days.

(21) Appl. No.: 09/682,038

(22) Filed: Jul. 12, 2001

(51) Int. Cl.$^7$ ................................................. B62B 5/04
(52) U.S. Cl. .................... 188/19; 280/33.994; 188/4 R; 188/216; 188/2 D; 188/166
(58) Field of Search ....................... 280/33.994; 188/19, 188/2 D, 4 R, 4 B, 20, 21, 9, 166, 167, 110, 1.12, 29, 216; 74/488, 489; 29/40.11; D34/21, 17

(56) References Cited

U.S. PATENT DOCUMENTS

| | | |
|---|---|---|
| 2,958,537 A | 11/1960 | Young |
| 3,061,049 A | 10/1962 | Bramley |
| 3,095,211 A | 6/1963 | Altherr |
| 3,117,653 A | 1/1964 | Altherr |
| 3,376,954 A | 4/1968 | Neptune |
| 3,458,015 A | 7/1969 | Collins et al. |
| 3,501,164 A | 3/1970 | Peterson |
| 3,532,188 A | 10/1970 | Keiz |
| 3,687,241 A | 8/1972 | Fontana |
| 4,018,449 A | 4/1977 | Anderson |
| 4,109,740 A | 8/1978 | Andruchiw |
| 4,116,464 A | 9/1978 | Haley |
| 4,545,591 A | 10/1985 | Balha |
| 4,768,622 A | 9/1988 | Nicklasson et al. |
| 4,840,388 A | 6/1989 | Doughty |
| 4,976,447 A | 12/1990 | Batson |
| 5,046,748 A | 9/1991 | Oat-Judge |
| 5,090,517 A | 2/1992 | Doughty |
| 5,288,089 A | 2/1994 | Bowers et al. |
| 5,325,938 A | 7/1994 | King |
| 5,456,336 A | 10/1995 | Bopp |
| 5,465,986 A | 11/1995 | MacRae |
| 5,499,697 A | 3/1996 | Trimble et al. |
| 6,123,343 A | 9/2000 | Nolgtin, Jr. et al. |

FOREIGN PATENT DOCUMENTS

| | | |
|---|---|---|
| DE | 3045302 A1 | 7/1982 |
| EP | 0509786 A2 | 4/1992 |
| FR | 2554776 A | 10/1983 |
| WO | WO8403073 | 2/1983 |

*Primary Examiner*—Douglas C. Butler
(74) *Attorney, Agent, or Firm*—Hovey Williams LLP

(57) ABSTRACT

A brake controlling mechanism for a cart having a conventional handle mounting bracket defining a handle mounting axis. A core is shiftably coupled to the handle mounting bracket and rotatable about the handle mounting axis. An elongated handle is coupled to the core offset relative to the handle mounting axis.

25 Claims, 3 Drawing Sheets

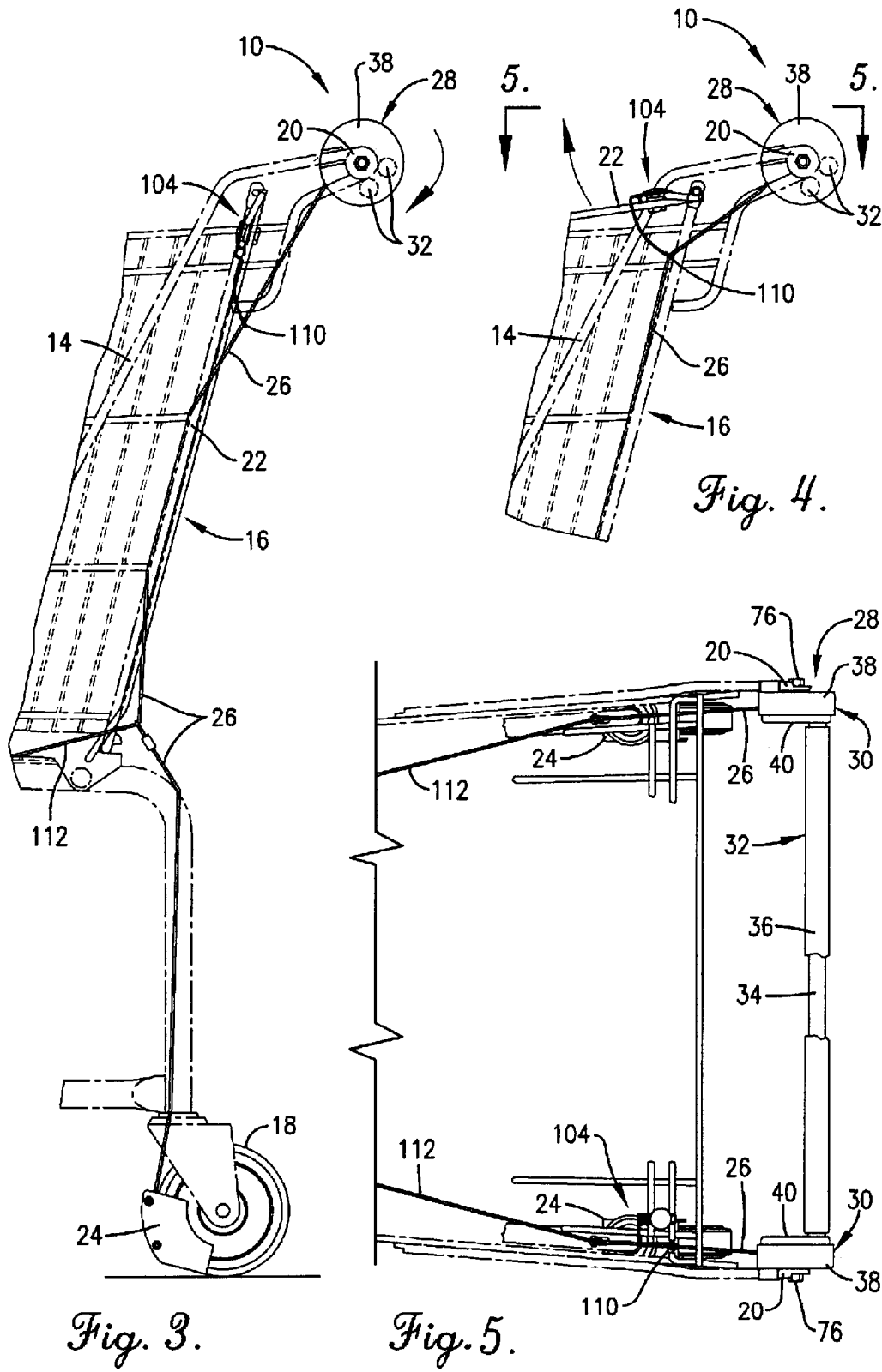

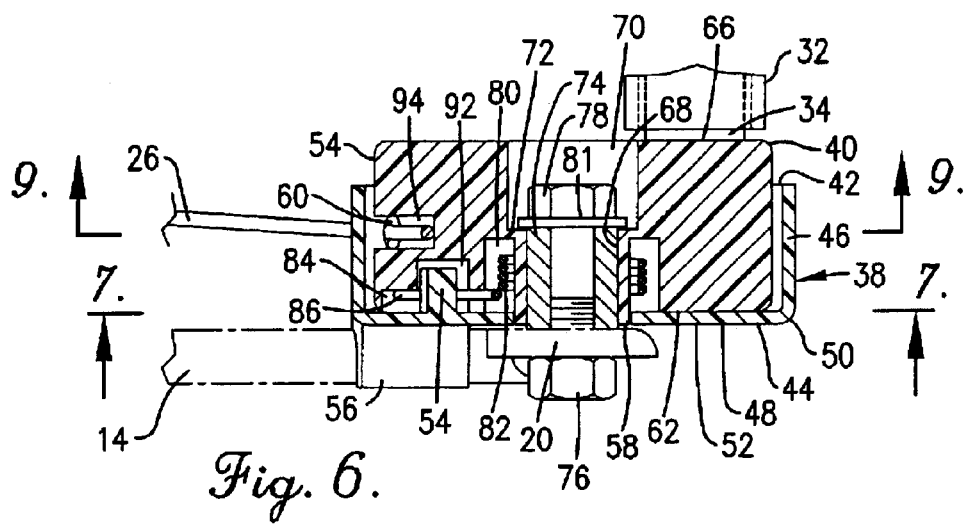
Fig. 6.
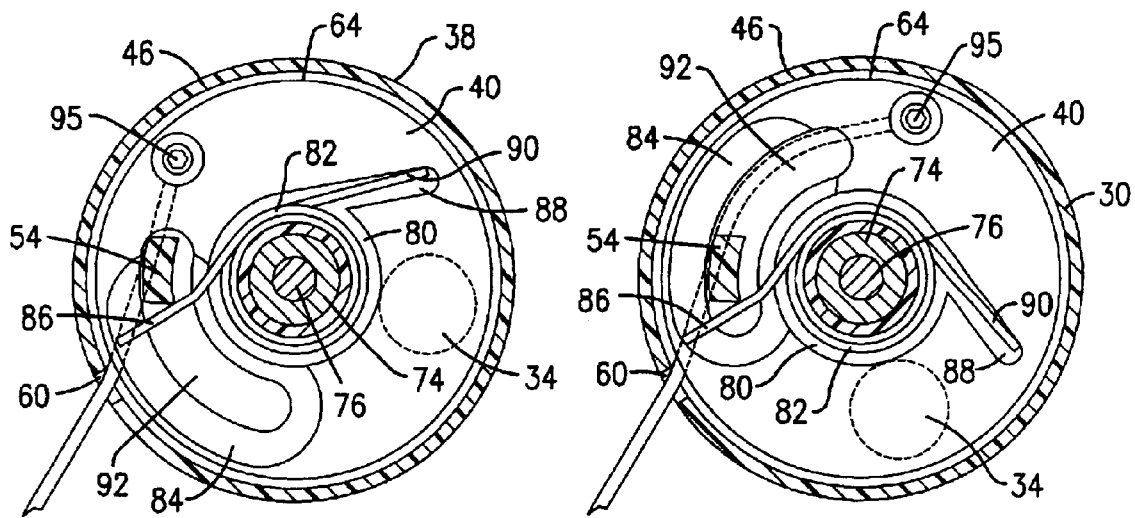
Fig. 7.
Fig. 8.
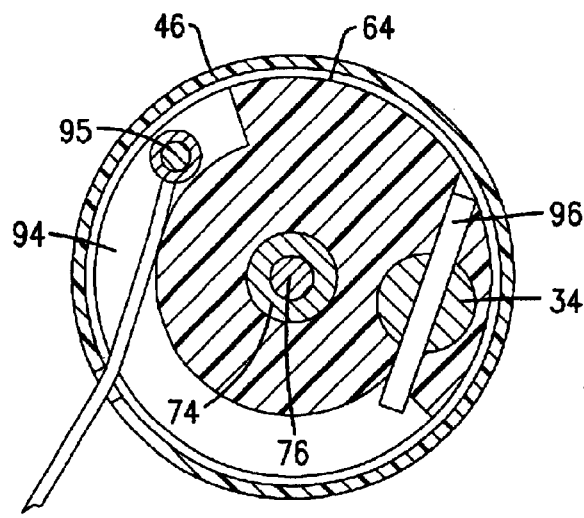
Fig. 9.

CART BRAKE RELEASE HANDLE

BACKGROUND OF THE INVENTION

1. Field of the Invention

This invention relates to wheeled carts having braking mechanisms. The invention further concerns handles for controlling the braking mechanisms on shopping carts.

2. Discussion of Prior Art

Shopping carts, grocery carts, strollers, and the like present a hazard to persons and property when such carts move unattended by the user. The potential for damage increases substantially when the cart is heavily loaded or on an inclined surface. In addition, small children occupying the child seat in a cart or stroller may also be at significant risk in an unsupervised cart. Accordingly, braking mechanisms for carts have been developed to eliminate such concerns by impeding cart movement when the cart is left unattended.

A number of cart braking mechanisms have been proposed in the past. The devices of the prior art, however, have several notable drawbacks. For example, braking mechanisms have not been easy to operate nor well accepted by the using public. Further, persons suffering from arthritis or other inflictions affecting the joints of the hand may be unable to manipulate the brake controlling mechanism in order to disengage the cart brake. Additionally, conventional brake control mechanisms can be difficult to install on existing carts. The inadequacies of such prior mechanisms are apparent by the failure of cart manufacturers to incorporate this beneficial safety feature into commercially available carts.

SUMMARY OF INVENTION

According to one embodiment of the present invention, a brake controlling mechanism for a cart is provided. The cart has a brake, frame, and a conventional handle mounting bracket. The brake is coupled to a brake line and is shiftable between an engaged position for impeding cart movement and a disengaged position for permitting unimpeded cart movement. The brake controlling mechanism comprises a cap, a core, and a handle. The cap is adapted to be fixedly coupled to the frame. The core is adapted to be pivotally coupled to the handle mounting bracket and is at least partially disposed within the cap. The core is rotatable relative to the cap on a core axis. The handle is coupled to the core and is offset relative to the core axis.

In accordance with another embodiment of the present invention, a braking system for selectively impeding movement of a shopping cart is provided. The shopping cart has a frame, nesting panel, and a conventional handle mounting bracket. The handle mounting bracket defines a handle mounting axis along which a conventionally mounted shopping cart handle may extend. The braking system comprises a brake, brake line, cap, core, and handle. The brake is shiftable between an engaged position for impeding cart movement and a disengaged position for permitting unimpeded cart movement. The brake line is coupled to the brake. The cap is adapted to be fixedly secured to the frame. The core is adapted to be pivotally coupled to the handle mounting bracket and at least partially disposed within the cap. The core is rotatable about the handle mounting axis. The core includes a brake line connector for coupling the brake line to the core. The brake line connector is offset relative to the handle mounting axis. The handle is coupled to the core and is offset relative to the handle mounting axis. The handle is shiftable between a pushing position corresponding to the disengaged position of the brake and a resting position corresponding to the engaged position of the brake.

In a further embodiment of the present invention, a shopping cart is provided. The cart includes a frame, handle mounting bracket, wheels, brake, brake line, cap, core, and handle. The handle mounting bracket is fixedly coupled to the cart frame. The wheels are operatively coupled to the cart frame for moveably supporting the cart frame on a support surface. The brake is shiftable between an engaged position for impeding cart movement and a disengaged position for permitting unimpeded cart movement. The brake line is coupled to the brake. The cap is fixedly secured to the frame. The core is pivotally coupled to the handle mounting bracket and at least partially disposed within the cap. The core is coupled to the brake line and rotatable on a core axis. The handle is coupled to the core and extends therefrom eccentric to the core axis.

In another embodiment of the present invention a method of retrofitting a conventional shopping cart with an automatically engaging brake system, said method comprising the steps of: (a) removing a conventional shopping cart handle from a conventional handle mounting bracket; (b) mounting a core on the handle mounting bracket, the core being rotatable relative to the handle mounting bracket on a core axis of rotation; (c) coupling a brake line to the core at a location offset relative to the core axis of rotation; and (d) coupling an elongated handle to the core at a location offset relative to the core axis of rotation.

The present invention provides a brake controlling mechanism specially designed for ease of operation, as well as rapid installation and cost-effective implementation. The brake controlling mechanism provides for impeding the unintended forward movement of a cart while requiring substantially no additional actions on the part of users for normal cart operation. Other aspects and advantages of the present invention will be apparent from the following detailed description of the preferred embodiment and the accompanying drawing figures.

BRIEF DESCRIPTION OF DRAWINGS FIGURES

Preferred embodiments of the invention are described in detail below with reference to the attached drawing figures, wherein:

FIG. 3 is a side view of a shopping cart brake system with the brake in a disengaged position;

FIG. 4 is a side view of a brake controlling mechanism and a nesting release operator in a nesting position;

FIG. 5 is a top view of the brake operating mechanism and nesting release operator shown in FIG. 4;

FIG. 6 is a cross-sectional top view of a brake controlling mechanism;

FIG. 7 is a cross-sectional side view taken along line 7—7 in FIG. 6 and showing a brake controlling mechanism in a position corresponding to the brake in an engaged position;

FIG. 8 is a cross-sectional side view of a brake controlling mechanism in a position corresponding to the brake in a disengaged position; and FIG. 9 is a is a cross-sectional side view taken along line 9—9 in FIG. 6 and showing a brake controlling mechanism in a position corresponding to the brake in an engaged position.

DETAILED DESCRIPTION OF THE PREFERRED EMBODIMENT

Figure 1:
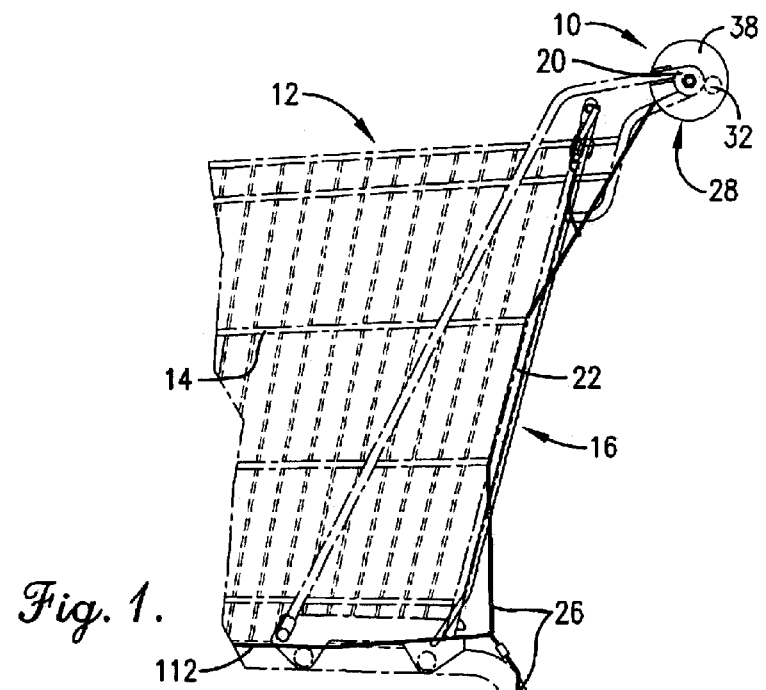
FIG. 1 is a side view of a shopping cart brake system with the brake in an engaged position.

Turning initially to FIG. 1, a brake system 10 is illustrated on a shopping cart 12. Cart 12 is depicted in broken lines to more clearly illustrate brake system 10. Cart 12 includes a frame 14 presenting a cart rear 16. Cart 12 further includes a pair of spaced apart rear wheels 18, a pair of spaced apart handle mounting brackets 20, and a nesting panel 22 hingedly coupled to frame 14 at cart rear 16. Handle mounting brackets 20 define a handle mounting axis extending between handle mounting brackets 20 on which a conventional shopping cart handle is traditionally mounted. Nesting panel 22 rotates to open cart rear 16, thereby allowing nesting of multiple carts.

Brake system 10 broadly includes a brake 24 mounted adjacent to wheel 18, a brake line 26, and a brake controlling mechanism 28. Brake 24 is selectively shiftable between an engaged position for impeding forward movement of cart 12, shown in FIG. 1, and a disengaged position for permitting unimpeded movement of cart 12, shown in FIG. 3. Brake 24 is preferably a chock-type brake mechanism as described in U.S. Pat. No. 6,123,343, the entire disclosure of which is hereby incorporated by reference. Brake system 10 can be employed to control rotation of both rear wheels, with each side of the system being mirror images of one another. Alternatively, brake system 10 can be employed to control the rotation of only a single wheel. Thus, while the construction and operation brake system 10 are described with reference to a single brake 24 and brake line 26, it should be appreciated that this description is applicable to systems with a brake on one or more wheels.

As perhaps best shown in FIG. 5, brake controlling mechanism 28 is attached to handle mounting brackets 20 and coupled to brake line 26 for selectively shifting brake 24. Brake controlling mechanism 28 includes a pair of handle supports 30 and a handle 32 disposed between and coupled to handle supports 30. Handle 32 is generally cylindrical in shape and is configured to be easily graspable by a user. Handle 32 includes a bar 34 and a sleeve 36. Sleeve 36 substantially covers and is preferably configured to be independently rotatable about bar 34. Bar 34 provides strength for handle 32 and is connected to each handle support 30. Bar 34 is preferably manufactured from stainless steel or other strong, durable material. Sleeve 36 is preferably fabricated from a suitable synthetic resin material.

Handle support 30 includes a stationary end cap 38 and a rotatable core 40. End cap 38 is configured to be fixedly mounted on frame 14 proximate mounting bracket 20. Core 40 is at least partially received within end cap 38 and is at least partially rotatable relative to end cap 38. Left and right cores 40 are rotatable about a substantially common axis of rotation corresponding to the conventional handle mounting axis. Preferably, end cap 38 at least partially covers core 40. End cap 38 and core 40 are preferably fabricated from a suitable synthetic resin material such as, or example, an ultra high molecular weight polymer.

Referring now to FIG. 6, end cap 38 is generally cup-shaped with an open end 42 adapted to receive core 40, a closed end 44 adapted to be secured to frame 14, and a sidewall 46 adapted to at least partially cover core 40. Closed end 44 comprises a substantially disk-shaped wall 48 having an inner surface 50 and an outer surface 52. A tab 54 projects from inner surface 50 toward core 40. A brace 56 extends from outer surface 52 and attaches to frame 14 adjacent handle mounting bracket 22 to fixedly secure end cap 38 to frame 14 and prevent rotation of end cap 38 relative to frame 14. End wall 48 includes a substantially centered mounting hole 58 adapted to be aligned with an aperture in handle mounting brackets 20 which defines a conventional handle mounting axis. Sidewall 48 includes a brake line aperture 60 positioned to allow passage of brake line 26 through end cap 38.

Now referring to FIGS. 6–9, core 40 preferably comprises a substantially solid cylindrical body with a number of holes, grooves, and/or slots formed or milled therein. Core 40 presents an outboard surface 62, a radial surface 64, an inboard surface 66, a first bore 68, and a second bore 70. First and second bores 68,70 are generally centered on the axis of rotation of core 40. First bore 68 originates at outboard surface 62 and extends toward the center of core 40. Second bore 70 originates at inboard surface 66 and extends towards the center of core 40. First bore 68 generally has a smaller diameter than second bore 70. Thus, at the junction of first and second bores 68,70 a flange 72 is formed.

To pivotally couple core 40 to handle mounting bracket 22 an annular cylindrical spacer 74 is inserted into first bore 68 and a bolt 76, nut 78, and washer 80 are used to fixedly couple spacer 74 to handle mounting bracket 20. The outside surface of spacer 74 has a diameter which is marginally smaller than the inside surface of first bore 68 to thereby allow for rotation of core 40 relative to spacer 74. Further, the length of spacer 74 is marginally greater than the length of first bore 68. Thus, when washer 80 is held firmly against spacer 74 by tightening bolt 76, washer 80 extends over flange 72 but is not securely coupled thereto, thereby holding core 40 to handle mounting bracket 20 without restraining rotation of core 40 relative thereto.

Core 40 includes a spring recess 80 around which a spring 82 is disposed. Spring recess 80 is formed around first bore 68 and is sized to receive spring 82. A shallow groove 84 is formed adjacent to spring recess 80 and receives a first extend portion 86 of spring 82. A counter-force groove 80 receives a second extended portion 90 of spring 82. A deep groove 92 is formed adjacent to shallow groove 84 and is adapted to receive tab 54 of end cap 38. A brake line groove 94 is formed in radial surface 64, aligned with brake line aperture 60, and sized to receive brake line 26. A brake line connector 95 is secured to core 40 within brake line groove 94 and couples brake line 26 to core 40. Brake line connector 95 is offset relative to the axis of rotation of core 40 so that rotation of core 40 causes shifting of brake line 26. Bar 34 of handle 32 is secured to core 40 by handle pin 96 at a location which is offset relative to the axis of rotation of core 40. In the present inventive configuration, the axis of rotation of core 40 is preferably substantially the same as the axis on which a traditional handle may be mounted on handle mounting brackets 20.

In operation, when a pushing force is applied to handle 32, bar 34 exerts a torsional force on core 40. The torsional force on core 40 is partially resisted by spring 82 whose first extend portion 86 presses against tab 54 of end cap 38 and whose second extended portion 90 presses against counter-force groove 88 of core 40. When the pushing force is sufficient to over come the bias of spring 82, as shown is FIG. 8, core 40 rotates relative to end cap 38 thereby causing brake line 26 to be draw into brake line groove 94 through brake line aperture 60. This movement of brake line 26 causes brake 24 to shift from its engaged position to its disengaged position to thereby allow the cart to move forward. When the pushing force is terminated, as shown in FIG. 7, spring 80 forces core 40 to rotate to a resting position, shown in FIG. 7, which corresponds to the brake engaged position to thereby inhibit forward movement of the cart.

Figure 2:
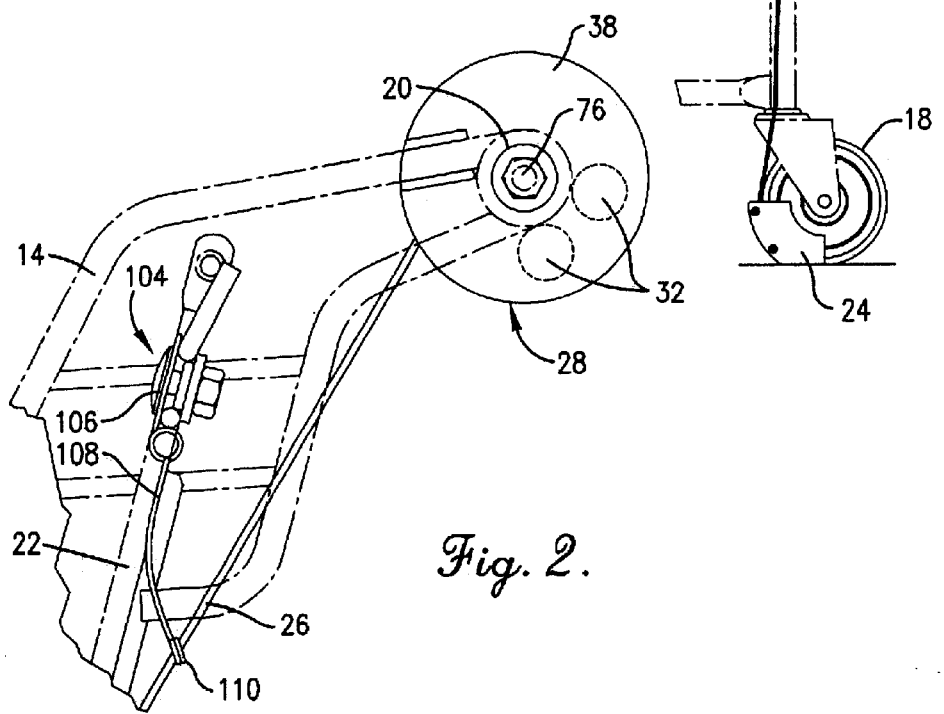
FIG. 2 is a side view of a brake controlling mechanism and a nesting release operator in an un-nested position.

As shown in FIG. 2, brake system 10 can also include a nesting release operator 104. Nesting panel 22 is rotatable to open cart rear 1 6, allowing the placement of a second cart partially within the frame of a first cart. Carts are typically nested, one inside another, when not in use. While nested, unimpeded cart movement is necessary to reposition the carts. Nesting release operator 104 is attached to nesting panel 22. Nesting release operator 104 includes a nesting fastener 106 and a connector 108. Nesting fastener 106 attaches connector 108 to nesting panel 22. Nesting fastener 106 may be constructed from a standard steel nut and bolt, with due consideration for durability and appearance. Connector 108 is slidably connected to brake line 26 between brake controlling mechanism 28 and brake 24. Connector 108 presents a loop 110 which surrounds brake line 26, allowing brake line 26 to pass therethrough. When nesting panel 22 rotates upwards, as shown in FIG. 5, connector 108 pivots away from cart rear 16. Loop 116 slides along brake line 26 and pulls brake line 26 up and forward, thereby retracting cable line 26. Brake 24 is thus shifted from the engaged position to the disengaged position. Upon removal of the second cart from the nested configuration, nesting panel 22 and connector 108 pivot downward and toward cart rear 16. This corresponding shifting of connector 108 allows brake line 26 to slack. As brake line 26 slackens, brake 24 shifts to the engaged position. It should be noted that inadvertent cart separation causes brake system 10 of the separated cart of automatically engage.

The present invention is compatible with other means of shifting brake 24 from the engaged position to the disengaged position. One such means includes the use of a bale (not shown) installed on the forward end of the cart and interconnected with brake line 26 by a front brake line 112. Such bale is described in U.S. Pat. No. 5,499,697, the entire disclosure of which is incorporated herein by reference. Lifting of the bale causes rotation of the front brake line 112, which thereby results in placing tension on brake line 26, shifting brake 24 to the disengaged position. Such bale would be useful, for example, for disengaging brake 24 in order to remove a forwardmost cart from a group of nested carts.

Brake controlling mechanism 28 of the present invention is designed not only for use in the manufacturing of new carts, but is equally suitable for simple and quick retrofitting of existing carts by unskilled personnel. To retrofit an existing cart, the standard handle bolts are unfastened from handle mounting brackets 20 and the standard handle is removed. If a cart brake system is not already installed, then a brake system essentially as described in U.S. Pat. No. 6,123,343 should be installed on the cart in accordance with its instructions, excluding a brake operating mechanism. Brake line 26 is connected to brake controlling mechanism 28 of the present invention for operation by routing brake line 26 from brake 24 through loop 110 and brake line aperture 60. Brake line 26 is then coupled to core 40 with connector 95. Core 40 is installed in end cap 38, with spring 82 biasing core 40 to the position corresponding to the brake engaged position. Each handle support 30 is then attached to respective mounting brackets 20 with brace 56, support bolt 76, support spacer 72, support washer 80, and support nut 78. Support spacer 74 allows support bolt 76 to securely fasten brake controlling mechanism 28 to mounting bracket 20, while ensuring core 40 is free to pivot. Brace 56 of end cap 38 is coupled to frame 14 to restrain end cap 38 from rotation. The installation of brake line 26 is required for each wheel 18 fitted with brake 24.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. A brake controlling mechanism for a cart, said cart having a brake, a frame, and a conventional handle mounting bracket, said brake coupled to a brake line and shiftable between an engaged position for impeding cart movement and a disengaged position for permitting unimpeded cart movement, said mechanism comprising:

a cap adapted to be fixedly coupled to the frame;
   a core adapted to be pivotally coupled to the handle mounting bracket, said core at least partially disposed within the cap and rotatable relative to the cap on a core axis; and
   an elongated handle coupled to the core and being offset relative to the core axis.

2. The mechanism as claimed in claim 1,
   said core including a connector for coupling the brake line to the core, said connector being offset relative to the core axis.

3. The mechanism as claimed in claim 2,
   said cap having a substantially cylindrical inner surface, said core having a substantially cylindrical outer surface, said inner surface at least partially covering said outer surface.

4. The mechanism as claimed in claim 2; and
   a biasing mechanism operable to urge the core to rotate in a direction corresponding to shifting the brake into the engaged position.

5. The mechanism as claimed in claim 4,
   said biasing mechanism including a spring contacting the cap and the core.

6. The mechanism as claimed in claim 4,
   said handle extending from the core substantially parallel to the core axis.

7. The mechanism as claimed in claim 6,
   said handle including a bar fixedly coupled to the core and a sleeve rotatably mounted on the bar.

8. A braking system for selectively impeding movement of a shopping cart having a frame, a nesting panel, and a conventional handle mounting bracket, said handle mounting bracket defining a handle mounting axis along which a conventionally mounted shopping cart handle may extend, said system comprising:

a brake shiftable between an engaged position for impeding cart movement and a disengaged position for permitting unimpeded cart movement;
   a brake line coupled to the brake;
   a cap adapted to be fixedly secured to the frame;
   a core adapted to be pivotally coupled to the handle mounting bracket and at least partially disposed within the cap, said core rotatable about the handle mounting axis, said core including a brake line connector for coupling the brake line to the core, said brake line connector being offset relative to the handle mounting axis; and an elongated handle coupled to the core and being offset relative to the handle mounting axis, said handle shiftable between a pushing position corresponding to the disengaged position of the brake and a resting position corresponding to the engaged position of the brake.

9. The system as claimed in claim 8; and a biasing mechanism operable to urge the core to rotate in a direction corresponding to shifting the brake into the engaged position.

10. The system as claimed in claim 9, said biasing mechanism including a spring contacting the cap and the core.

11. The system as claimed in claim 8; and a nesting release operator coupled to the nesting panel and slidably receiving the brake line, said nesting release operator operable to shift the brake line to a position corresponding to the disengaged position of the brake when the nesting panel is shifted into a nesting position.

12. The system as claimed in claim 8, said cap having a substantially cylindrical inner surface, said core having a substantially cylindrical outer surface, said inner surface at least partially covering said outer surface.

13. A shopping cart comprising:

a conventional shopping cart frame presenting front and rear portions;

a conventional shopping cart handle mounting bracket fixedly coupled to the rear portion of the cart frame, said handle mounting a bracket defining a handle mounting axis along which a conventionally mounted shopping cart handle would extend;

a plurality of conventional shopping cart wheels operatively coupled to the shopping cart frame for movably supporting the frame on a support surface;

a brake shiftable between an engaged position for impeding cart movement and a disengaged position for permitting unimpeded cart movement;

a brake line coupled to the brake;

a core shiftably coupled to the handle mounting bracket, said core coupled to the brake line and rotatable about the handle mounting axis; and an elongated handle coupled to the core and being offset relative to the handle mounting axis.

14. The mechanism as claimed in claim 13, said core including a biasing mechanism operable to urge the core to rotate in a direction corresponding to the engaged position.

15. The mechanism as claimed in claim 14; and a cap fixedly secured to the frame, said cap at least partially covering the core.

16. The cart as claimed in claim 15, said cap having a substantially cylindrical inner surface, said core having a substantially cylindrical outer surface, said inner surface at least partially covering said outer surface.

17. The cart as claimed in claim 16, said biasing mechanism including a spring contacting the cap and the core.

18. The cart as claimed in claim 17, said core including a connector for coupling the brake line to the core, said connector being offset relative to the handle mounting axis.

19. The cart as claimed in claim 18, said handle extending from the core substantially parallel to the handle mounting axis.

20. The cart as claimed in claim 19, said handle including a bar fixedly coupled to the core and a sleeve rotatably mounted on the bar.

21. A method of retrofitting a conventional shopping cart with an automatically engaging brake system, said method comprising the steps of:

(a) removing a conventional shopping cart handle from a conventional handle mounting bracket;

(b) mounting a core on the handle mounting bracket, said core being rotatable relative to the handle mounting bracket on a core axis of rotation;

(c) coupling a brake line to the core at a location offset relative to the core axis of rotation; and (d) coupling an elongated handle to the core at a location offset relative to the core axis of rotation.

22. The method as claimed in claim 21; and (e) mounting a cap on the shopping cart proximate the handle mounting axis.

23. The method as claimed in claim 22; and (f) at least partially disposing the core in the cap.

24. The method as claimed in claim 23; and (g) shiftably coupling a chock-type brake to the shopping cart wheel, said brake shiftable between an engaged position for impeding forward cart movement and a disengaged position for allowing unimpeded forward cart movement.

25. The method as claimed in claim 24; and (h) coupling the brake line to the brake.

* * * * *